(12) United States Patent
Okamoto et al.

(10) Patent No.: US 11,440,248 B2
(45) Date of Patent: Sep. 13, 2022

(54) THREE-DIMENSIONAL SHAPED OBJECT MANUFACTURING DEVICE

(71) Applicant: SEIKO EPSON CORPORATION, Tokyo (JP)

(72) Inventors: Eiji Okamoto, Matsumoto (JP); Akihiko Tsunoya, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 41 days.

(21) Appl. No.: 16/918,174

(22) Filed: Jul. 1, 2020

(65) Prior Publication Data

US 2021/0001548 A1    Jan. 7, 2021

(30) Foreign Application Priority Data

Jul. 4, 2019   (JP) .............................. JP2019-125317

(51) Int. Cl.

| | |
|---|---|
| *B29C 64/165* | (2017.01) |
| *B29C 64/245* | (2017.01) |
| *B29C 64/236* | (2017.01) |
| *B29C 64/209* | (2017.01) |
| *B29C 64/264* | (2017.01) |
| *B29C 64/255* | (2017.01) |
| *B29C 64/241* | (2017.01) |
| *B29C 64/35* | (2017.01) |
| *B33Y 30/00* | (2015.01) |

(52) U.S. Cl.
CPC .......... *B29C 64/165* (2017.08); *B29C 64/209* (2017.08); *B29C 64/236* (2017.08); *B29C 64/241* (2017.08); *B29C 64/245* (2017.08); *B29C 64/255* (2017.08); *B29C 64/264* (2017.08); *B29C 64/35* (2017.08); *B33Y 30/00* (2014.12)

(58) Field of Classification Search
CPC .................................................... B29C 64/165
See application file for complete search history.

(56) References Cited

U.S. PATENT DOCUMENTS

| | | | |
|---|---|---|---|
| 2005/0001356 A1 | 1/2005 | Tochimoto et al. | |
| 2017/0341365 A1* | 11/2017 | De Lajudie | ............. B29C 67/24 |
| 2018/0304358 A1* | 10/2018 | Myerberg | ................. B22F 3/18 |

FOREIGN PATENT DOCUMENTS

| | | | | | |
|---|---|---|---|---|---|
| GB | 2532518 A | * | 5/2016 | ........... | B29C 64/165 |
| GB | 2548340 A | * | 9/2017 | ........... | B29C 64/205 |
| JP | 2001-150556 | | 6/2001 | | |
| JP | 2018-052026 | | 4/2018 | | |

* cited by examiner

*Primary Examiner* — Timothy Kennedy
(74) *Attorney, Agent, or Firm* — Workman Nydegger

(57) ABSTRACT

In a three-dimensional shaped object manufacturing device, when a unit is moved in a forward direction, powder is supplied from a first supply portion, a powder layer is formed by a first layer forming portion, a liquid is discharged to a shaping region from a head, and a shaping table is moved in a direction separating from the unit after discharging the liquid is ended and before a second layer forming portion faces the shaping region, and when the unit is moved in a backward direction, the powder is supplied from a second supply portion, the powder layer is formed by the second layer forming portion, the liquid is discharged to the shaping region from the head, and the shaping table is moved in the direction separating from the unit after discharging the liquid to the shaping region is ended and before the first layer forming portion faces the shaping region.

8 Claims, 6 Drawing Sheets

THREE-DIMENSIONAL SHAPED OBJECT MANUFACTURING DEVICE

The present application is based on, and claims priority from JP Application Serial Number 2019-125317, filed Jul. 4, 2019, the disclosure of which is hereby incorporated by reference herein in its entirety.

BACKGROUND

1. Technical Field

The present disclosure relates to a three-dimensional shaped object manufacturing device.

2. Related Art

In the related art, various types of three-dimensional shaped object manufacturing devices are used. Among the devices, there is a three-dimensional shaped object manufacturing device in which a powder layer is formed and a liquid containing a binder is discharged from a head to a shaping region of a three-dimensional shaped object on the powder layer to manufacture the three-dimensional shaped object. For example, JP-A-2001-150556 discloses a three-dimensional shaping device in which a layer is formed of a powder material and a binder is discharged from a discharge nozzle of a nozzle head to the layer to manufacture a three-dimensional shaped object.

In the three-dimensional shaping device described in JP-A-2001-150556, since a powder supply portion configured to supply powder and the nozzle head are each independently configured, a size of the device tends to enlarge, and it is difficult to manufacture the three-dimensional shaped object at a high speed. In addition, there is a risk that a structural member of the device, such as a blade, during manufacturing of the three-dimensional shaped object, comes into contact with a structure of the three-dimensional shaped object during the manufacturing, and the structure may be damaged.

SUMMARY

A three-dimensional shaped object manufacturing device according to the present disclosure includes: a shaping table configured to move a shaping surface of a three-dimensional shaped object in a shaping surface moving direction intersecting the shaping surface; a unit configured to reciprocate with respect to the shaping table and including a first supply portion and a second supply portion configured to supply powder, a first layer forming portion and a second layer forming portion configured to form a powder layer on the shaping table using the powder, and at least one head configured to discharge a liquid containing a binder to a shaping region of the three-dimensional shaped object on the powder layer; and a control unit configured to control the unit and the shaping table, in which the unit includes the first supply portion, the first layer forming portion, the head, the second layer forming portion, and the second supply portion in an order from a head side in a forward direction in a reciprocating direction of the unit, and the control unit performs control to, when moving the unit in the forward direction when shaping the three-dimensional shaped object, supply the powder from the first supply portion, form the powder layer on the shaping table using the powder by the first layer forming portion, discharge the liquid to the shaping region from the head, and move the shaping table in a direction separating from the unit after discharging the liquid to the shaping region is ended and before the second layer forming portion faces the shaping region, and when moving the unit in a backward direction in the reciprocating direction when shaping the three-dimensional shaped object, supply the powder from the second supply portion, form the powder layer on the shaping table using the powder by the second layer forming portion, discharge the liquid to the shaping region from the head, and move the shaping table in the direction separating from the unit after discharging the liquid to the shaping region is ended and before the first layer forming portion faces the shaping region.

DESCRIPTION OF EXEMPLARY EMBODIMENTS

Figure 1:
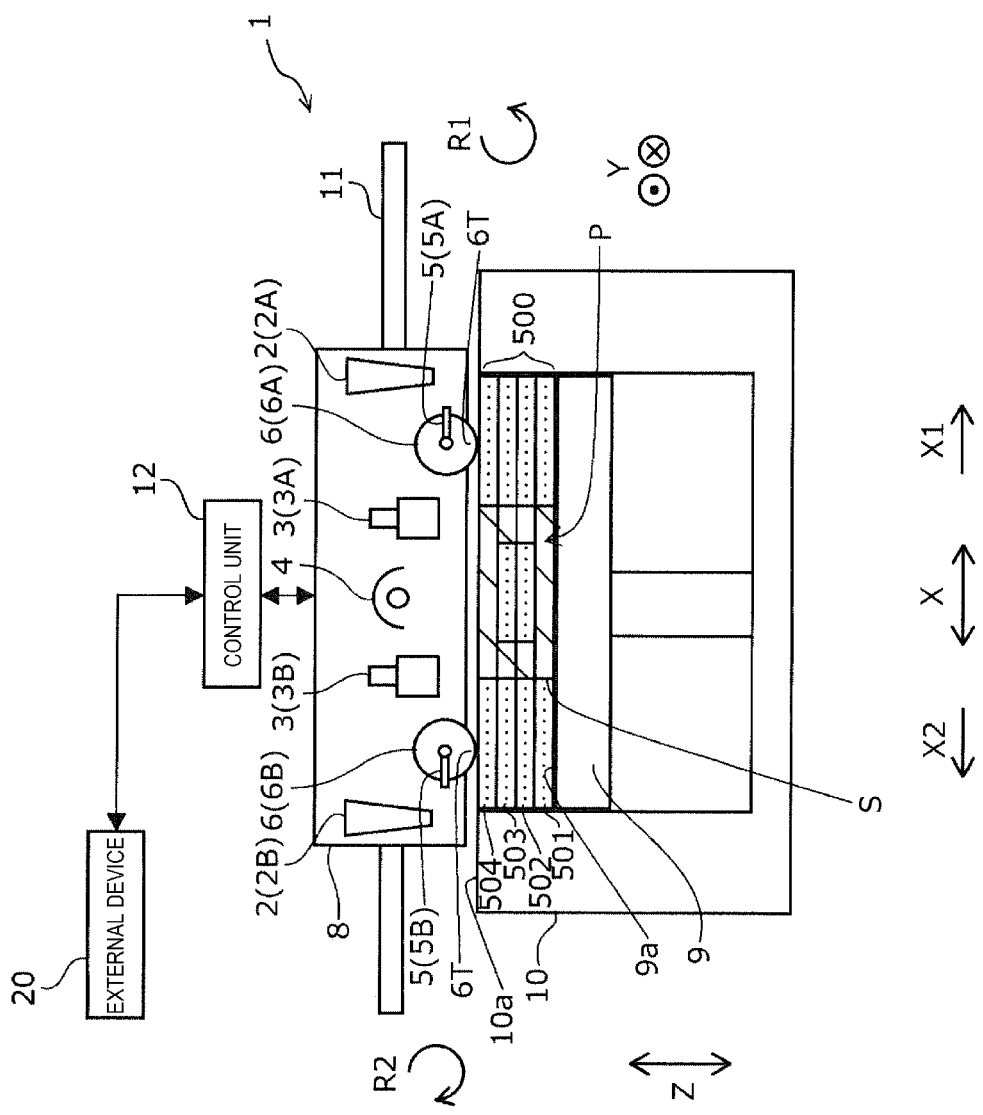
FIG. 1 is a schematic configuration diagram showing a three-dimensional shaped object manufacturing device according to a first embodiment of the present disclosure.

First, the present disclosure will be schematically described.

A three-dimensional shaped object manufacturing device according to a first aspect of the present disclosure includes: a shaping table configured to move a shaping surface of a three-dimensional shaped object in a shaping surface moving direction intersecting the shaping surface; a unit configured to reciprocate with respect to the shaping table and including a first supply portion and a second supply portion configured to supply powder, a first layer forming portion and a second layer forming portion configured to form a powder layer on the shaping table using the powder, and at least one head configured to discharge a liquid containing a binder to a shaping region of the three-dimensional shaped object on the powder layer; and a control unit configured to control the unit and the shaping table, in which the unit includes the first supply portion, the first layer forming portion, the head, the second layer forming portion, and the second supply portion in an order from a head side in a forward direction in a reciprocating direction of the unit, and the control unit performs control so as to, when moving the unit in the forward direction when shaping the three-dimensional shaped object, supply the powder from the first supply portion, form the powder layer on the shaping table using the powder by the first layer forming portion, discharge the liquid to the shaping region from the head, and move the shaping table in a direction separating from the unit after discharging the liquid to the shaping region is ended and before the second layer forming portion faces the shaping region, and when moving the unit in a backward direction in the reciprocating direction when shaping the three-dimensional shaped object, supply the powder from the second supply portion, form the powder layer on the shaping table using the powder by the second layer forming portion, discharge the liquid to the shaping region from the head, and move the shaping table in the direction separating from the unit after discharging the liquid to the shaping region is ended and before the first layer forming portion faces the shaping region.

According to this aspect, since the first supply portion and the second supply portion, the first layer forming portion and the second layer forming portion, and the head are included in one unit, enlargement in a size of the device can be prevented. In addition, since the supply portions configured to supply the powder, the forming portions configured to form the powder layer, and heads are symmetrical in the reciprocating direction of the unit, a structure of the three-dimensional shaped object can be manufactured in the forward and backward directions, so that the three-dimensional shaped object can be manufactured at a high speed. Further, since the shaping table moves in the direction separating from the unit before the layer forming portion faces the shaping region in the forward and backward directions, contact between the layer forming portion and the structure of the three-dimensional shaped object during the manufacturing can be prevented.

In the three-dimensional shaped object manufacturing device according to a second aspect of the present disclosure according to the first aspect, the binder is a resin cured by applying energy, and the unit includes at least one energy applying portion for curing the binder.

According to this aspect, it is possible to firmly bind the powder by using the resin cured by applying the energy.

In the three-dimensional shaped object manufacturing device according to a third aspect of the present disclosure according to the second aspect, the head includes a first head provided on a first layer forming portion side in the reciprocating direction and a second head provided on a second layer forming portion side in the reciprocating direction, and the energy applying portion is provided between the first head and the second head in the reciprocating direction.

According to this aspect, since the energy applying portion is provided in a symmetrical arrangement in the reciprocating direction of the unit, the energy can be applied in the forward and backward directions. Therefore, the three-dimensional shaped object can be manufactured at a high speed.

In the three-dimensional shaped object manufacturing device according to a fourth aspect of the present disclosure according to the second aspect, the energy applying portion includes a first energy applying portion and a second energy applying portion.

According to this aspect, since the energy applying portion includes the first energy applying portion and the second energy applying portion, for example, different types of energy can be applied. Therefore, it is possible to particularly effectively apply the energy to the structure of the three-dimensional shaped object when a plurality of binders having different curing properties are used.

In the three-dimensional shaped object manufacturing device according to a fifth aspect of the present disclosure according to the first aspect, when an (n+1)th powder layer is to be formed after an n-th powder layer is formed on the shaping table with n being a natural number, the control unit controls the shaping table to move by a layer thickness of the (n+1)th powder layer in the direction separating from the unit when shaping a three-dimensional shaped object of the n-th layer.

According to this aspect, when the (n+1)th powder layer is to be formed after the n-th powder layer is formed on the shaping table, the shaping table is moved by a layer thickness of the (n+1)th powder layer in the direction separating from the unit when shaping the three-dimensional shaped object of the n-th layer, so that it is not necessary to move the shaping table when forming the (n+1)th powder layer, and a movement control of the shaping table can be simplified.

In the three-dimensional shaped object manufacturing device according to a sixth aspect of the present disclosure according to the first aspect, when an (n+1)th powder layer is to be formed after an n-th powder layer is formed on the shaping table with n being a natural number, the control unit controls the shaping table to move by more than a layer thickness of the (n+1)th powder layer in the direction separating from the unit when shaping a three-dimensional shaped object of the n-th layer.

According to this aspect, when the (n+1)th powder layer is to be formed after the n-th powder layer is formed on the shaping table, the shaping table is moved by a distance longer than the layer thickness of the (n+1)th powder layer in the direction separating from the unit when shaping the three-dimensional shaped object of the n-th layer, so that a distance between the structure and the layer forming portion in the shaping surface moving direction can be increased, and the contact between the layer forming portion and the structure of the three-dimensional shaped object during the manufacturing can be particularly effectively prevented.

In the three-dimensional shaped object manufacturing device according to a seventh aspect of the present disclosure according to the first aspect, the first layer forming portion and the second layer forming portion are rollers having rotation shafts in a direction intersecting the shaping surface moving direction and the reciprocating direction, and the control unit performs control to, when moving the unit in the forward direction when shaping the three-dimensional shaped object, rotate the first layer forming portion such that a shaping table side of the first layer forming portion faces the head side in the forward direction, and when moving the unit in the backward direction when shaping the three-dimensional shaped object, rotate the second layer forming portion such that a shaping table side of the second layer forming portion faces a head side in the backward direction.

According to this aspect, the first layer forming portion and the second layer forming portion can be easily configured with the rollers, and by rotating the roller such that the shaping table side of the roller faces the head side in the moving direction of the unit, the powder layer can be formed with high accuracy.

In the three-dimensional shaped object manufacturing device according to an eighth aspect of the present disclosure according to the first aspect, an interval between the first layer forming portion and the head in the reciprocating direction and an interval between the second layer forming portion and the head in the reciprocating direction are adjustable.

According to this aspect, since the interval between the first layer forming portion and the head in the reciprocating direction and the interval between the second layer forming portion and the head in the reciprocating direction are adjustable, the interval between the first layer forming portion and the head in the reciprocating direction and the interval between the second layer forming portion and the head in the reciprocating direction can be optimized according to a size of the structure of the three-dimensional shaped object to be formed.

Embodiments of the present disclosure will be described below with reference to the accompanying drawings.

First, a three-dimensional shaped object manufacturing device 1 configured to execute a method for manufacturing a three-dimensional shaped object of the present disclosure according to an embodiment will be described with reference to FIG. 1. Here, in FIG. 1 and the figures to be described later, an X direction is a horizontal direction and corresponds to a reciprocating direction of a supply unit 8, and an X1 direction corresponds to a forward direction and an X2 direction corresponds to a backward direction. A Y direction is a horizontal direction and a direction orthogonal to the X direction, and corresponds to a direction in which a rotation shaft of a roller 6 extends. A Z direction is a vertical direction, and corresponds to a stacking direction of layers 500 and a shaping surface moving direction.

The term "three-dimensional shaping" in this description refers to forming a so-called three-dimensional shaped object, and includes, for example, forming a shape having a thickness even in a shape of a flat plate shape that is a so-called two-dimensional shape.

The three-dimensional shaped object manufacturing device 1 according to the present embodiment is a three-dimensional shaped object manufacturing device that manufactures a three-dimensional shaped object by stacking layers 500 including a layer 501, a layer 502, a layer 503, . . . , and a layer 50*n*. As shown in FIG. 1, the three-dimensional shaped object manufacturing device 1 according to the present embodiment includes a table unit 10 that includes a shaping table 9, the supply unit 8 that supplies a shaping material of the three-dimensional shaped object to the shaping table 9, and a control unit 12 that controls operations of the table unit 10 and the supply unit 8. The three-dimensional shaped object manufacturing device 1 is electrically coupled to an external device 20 such as a personal computer, and is configured to receive an instruction from a user via the external device 20.

The shaping table 9 is configured to move in the Z direction under a control of the control unit 12. A shaping surface 9*a* of the shaping table 9 is disposed at a position lower than an upper surface portion 10*a* of the table unit 10 by a predetermined distance in the Z direction, and the shaping material of the three-dimensional shaped object is supplied from the supply unit 8 to the shaping surface 9*a* to form one layer of the layers 500. Then, stacking is performed by repeating a downward movement of the shaping table 9 by a predetermined distance and a supply of the shaping material of the three-dimensional shaped object from the supply unit 8. FIG. 1 shows a state where a structure S of the three-dimensional shaped object is formed on the shaping surface 9*a* by repeating a formation of four layers of the layer 501, the layer 502, the layer 503, and a layer 504.

The supply unit 8 is configured to move in the X direction along a guide bar 11. In addition, the supply unit 8 includes shaping material supply portions 2 configured to supply the shaping material including powder of metal, ceramics, resin, or the like to the shaping table 9. The shaping material supply portions 2 include a first supply portion 2A formed at a head side end portion in the X1 direction and a second supply portion 2B formed at a head side end portion in the X2 direction.

In addition, the supply unit 8 includes the rollers 6 configured to compress and level the shaping material supplied to the shaping table 9. The rollers 6 include a roller 6A formed next to the first supply portion 2A in the X direction and a roller 6B formed next to the second supply portion 2B in the X direction. Here, the roller 6 constitutes a layer forming portion that forms the layer 500 that is a powder layer on the shaping table 9.

In addition, the supply unit 8 includes heads 3 that discharge a liquid containing a binder for binding powder contained in the shaping material supplied from the shaping material supply portions 2 to a shaping region P of the three-dimensional shaped object. The heads 3 include a first head 3A formed next to the roller 6A in the X direction and a second head 3B formed next to the roller 6B in the X direction. Here, the liquids discharged from the first head 3A and the second head 3B are the same liquid, and are liquids containing an ultraviolet ray curable resin as the binder. However, the liquid is not limited to such a liquid, and a liquid containing a thermosetting resin as the binder, a liquid in a state where a solid resin as the binder is dissolved in a volatile solvent, or the like may be used. Compositions of the liquid discharged from the first head 3A and the second head 3B may be different.

In addition, the supply unit 8 includes interval adjustment portions 5 configured to change positions of the rollers 6 in the X direction. An interval adjustment portion 5A adjusts an interval between the roller 6A and the head 3 in the X direction, and an interval adjustment portion 5B adjusts an interval between the roller 6B and the head 3 in the X direction. In other words, a distance from the upstream head 3 to the downstream roller 6 in a moving direction of the supply unit 8 is adjustable. Therefore, the three-dimensional shaped object manufacturing device 1 according to the present embodiment can optimize the interval between the roller 6A and the head 3 in the X direction and the interval between the roller 6B and the head 3 in the X direction according to a size of the structure S of the three-dimensional shaped object to be formed.

An ultraviolet ray irradiation portion 4 that performs irradiation with ultraviolet rays for curing the ultraviolet ray curable resin is provided between the first head 3A and the second head 3B in the X direction. The supply unit 8 according to the present embodiment includes one ultraviolet ray irradiation portion 4, but may include two or more ultraviolet ray irradiation portions 4, or according to a type of the liquid used, not include the ultraviolet ray irradiation portion 4, or include a heater for curing the thermosetting resin or volatilizing the solvent instead of the ultraviolet ray irradiation portion 4, or the like.

As shown in FIG. 1, in the supply unit 8 according to the present embodiment, structural members are disposed symmetrically in the X direction with respect to the ultraviolet ray irradiation portion 4. Therefore, the three-dimensional shaped object manufacturing device 1 according to the present embodiment can execute a shaping operation of the three-dimensional shaped object while moving the supply unit 8 in the X1 direction, and execute a shaping operation of the three-dimensional shaped object while moving the supply unit 8 in the X2 direction.

Thus, the three-dimensional shaped object manufacturing device 1 according to the present embodiment includes the shaping table 9 configured to move the shaping surface 9*a* of the three-dimensional shaped object in the Z direction that is a shaping surface moving direction intersecting the shaping surface 9*a*. In addition, the three-dimensional shaped object manufacturing device 1 includes the supply unit 8 configured to reciprocate with respect to the shaping table 9 and including the first supply portion 2A and the second supply portion 2B configured to supply the powder, the roller 6A as a first layer forming portion and the roller 6B as a second layer forming portion configured to form the layer 500 that is a powder layer on the shaping table 9 using powder, and at least one head 3 configured to discharge a liquid containing a binder to the shaping region P of the three-dimensional shaped object in the layer 500. Further, the three-dimensional shaped object manufacturing device 1 includes the control unit 12 configured to control the supply unit 8 and the shaping table 9. The supply unit 8 includes the first supply portion 2A, the roller 6A, the head 3, the roller 6B, and the second supply portion 2B in an order from a head side in the X1 direction of the supply unit 8.

Next, a specific example of the shaping material that can be used in the three-dimensional shaped object manufacturing device 1 according to the present embodiment will be described. As metal powder that can be contained in the shaping material, for example, simple powder of magnesium (Mg), iron (Fe), cobalt (Co), chromium (Cr), aluminum (Al), titanium (Ti), copper (Cu), and nickel (Ni), or powder of alloys containing one or more of these metals (maraging steel, stainless steel (SUS), cobalt chromium molybdenum, titanium alloy, nickel alloy, aluminum alloy, cobalt alloy, and cobalt chromium alloy), and mixed powder thereof can be used.

In addition, as ceramic powder that can be contained in the shaping material, for example, silicon dioxide, titanium dioxide, aluminum oxide, zirconium oxide, and silicon nitride can be used.

As resin powder that can be used in the shaping material, or as a binder contained in the liquid, for example, acryl (PMMA), acrylonitrile-butadiene-acrylate (ABS), acrylonitrile-styrene-acrylate (ASA), polylactic acid (PLA), polyetherimide (PEI), polycarbonate (PC), polypropylene (PP), polyethylene (PE), polyamide (PA), epoxy (EP), polyphenylene sulfide (PPS), polystyrene (PS), paraffin wax, polyvinyl alcohol (PVA), carboxymethyl cellulose, polyoxymethylene, and polymethyl methacrylate can be preferably used. In addition, for example, an acrylic resin, an epoxy resin, a silicone resin, a cellulosic resin, or another synthetic resin can be used alone or in combination. Further, a thermoplastic resin, an ultraviolet ray curable resin of a type using radical polymerization of an unsaturated double bond such as acrylic or a type using cationic polymerization such as epoxy can also be used.

As a solvent contained in the liquid, for example, water, (poly) alkylene glycol monoalkyl ethers such as ethylene glycol monomethyl ether, ethylene glycol monoethyl ether, propylene glycol monomethyl ether, and propylene glycol monoethyl ether, acetates such as ethyl acetate, n-propyl acetate, isopropyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, and ionic liquids such as tetraalkylammonium acetates (such as tetrabutylammonium acetate) can be used, and one or two or more selected from these can be used in combination.

Figure 2:
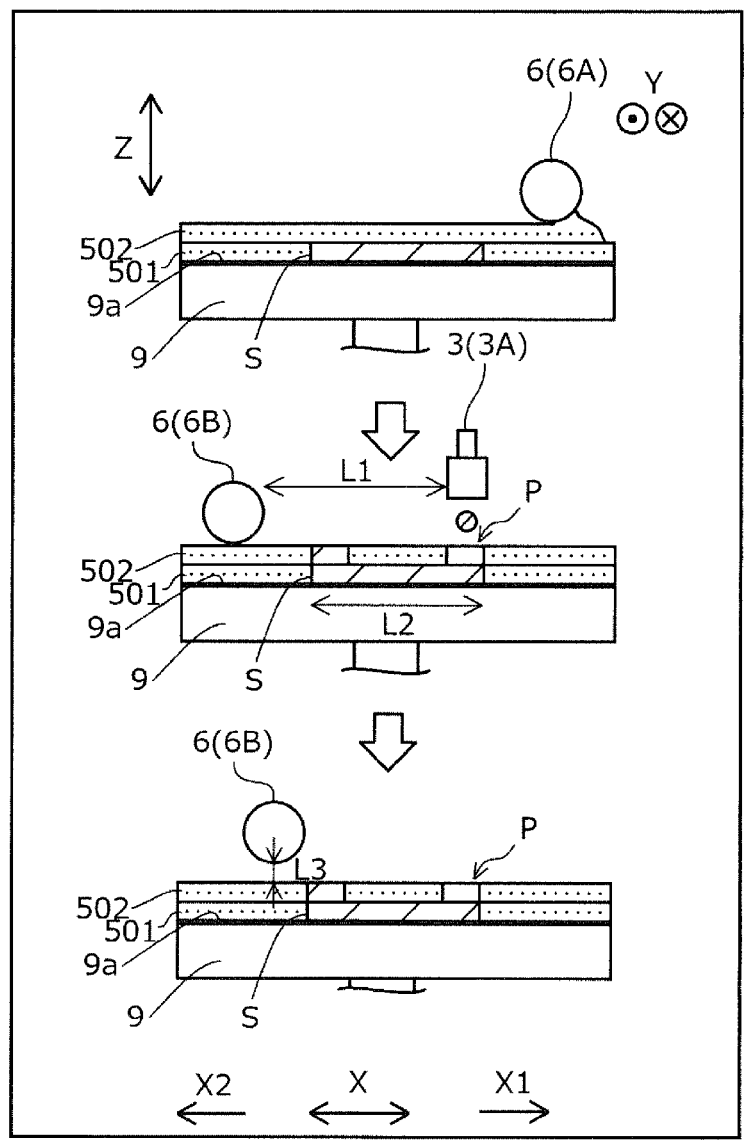
FIG. 2 is a schematic diagram showing a method for manufacturing a three-dimensional shaped object using the three-dimensional shaped object manufacturing device according to the first embodiment.
Figure 3:
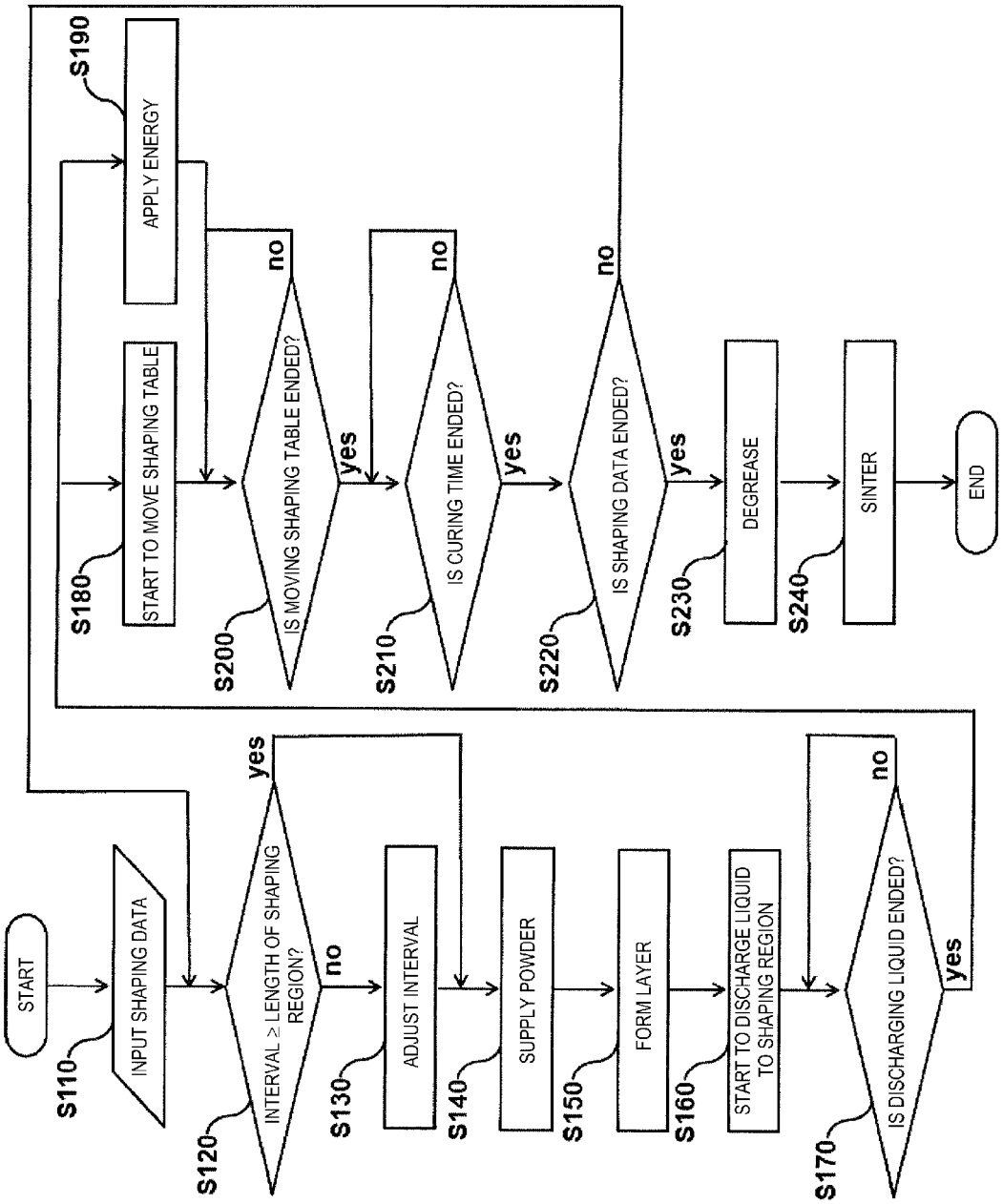
FIG. 3 is a flowchart of the method for manufacturing a three-dimensional shaped object using the three-dimensional shaped object manufacturing device according to the first embodiment.

Next, an example of a method for manufacturing a three-dimensional shaped object configured to be executed using the three-dimensional shaped object manufacturing device 1 will be described with reference to FIG. 2 and a flowchart of FIG. 3. The method for manufacturing a three-dimensional shaped object according to the present embodiment shown by the flowchart of FIG. 3 is performed by the control unit 12 performing control of the structural members of the three-dimensional shaped object manufacturing device 1 such as the supply unit 8 and the shaping table 9. FIG. 2 shows an example when forming the layer 502 of the layers 500.

In the method for manufacturing a three-dimensional shaped object according to the present embodiment, as shown in FIG. 3, first, in step S110, shaping data of the three-dimensional shaped object to be manufactured is input. An input source of the shaping data of the three-dimensional shaped object is not particularly limited, and the shaping data can be input to the three-dimensional shaped object manufacturing device 1 using the external device 20.

Next, in step S120, the control unit 12 determines whether an interval L1 between the upstream head 3 and the downstream roller 6 in the moving direction of the supply unit 8 is equal to or larger than a length L2 of the shaping region P. The control unit 12 makes the determination in this step based on the shaping data of the layers 500 to be formed and a value of a scale (not shown) for detecting a position of the roller 6 provided in the interval adjustment portion 5. Here, as shown in a middle state diagram of FIG. 2, when the supply unit 8 moves in the X1 direction to form the layer 500, the interval L1 is the interval between the first head 3A and the roller 6B in the X direction. On the other hand, when the supply unit 8 moves in the X2 direction to form the layer 500, the interval L1 is an interval between the second head 3B and the roller 6A in the X direction. As shown in the middle state diagram of FIG. 2, the length L2 of the shaping region P corresponds to a length of the entire structure S of the three-dimensional shaped object to be formed in the X direction.

When it is determined in step S120 that the interval L1 is less than the length L2 of the shaping region P, the processing proceeds to step S130, and the control unit 12 adjusts the interval L1 such that the interval L1 is equal to or larger than the length L2 of the shaping region P, and the processing proceeds to step S140. On the other hand, when it is determined in step S120 that the interval L1 is equal to or larger than the length L2 of the shaping region P, the processing skips step S130 and proceeds to step S140.

In step S140, the shaping material supply portion 2 supplies the shaping material to the shaping surface 9a of the shaping table 9, thereby supplying powder as a constituent material of the three-dimensional shaped object. Then, in step S150, the shaping material is compressed and leveled by the roller 6 to form the layer 500. An uppermost state diagram of FIG. 2 shows a state where the supply unit 8 moves in the X1 direction to form the layer 502. Here, when the supply unit 8 moves in the X1 direction to form the layer 500, the first supply portion 2A supplies the shaping material and the shaping material is compressed and leveled by the roller 6A to form the layer 500. On the other hand, when the supply unit 8 moves in the X2 direction to form the layer 500, the second supply portion 2B supplies the shaping material and the shaping material is compressed and leveled by the roller 6B to form the layer 500.

Next, in step S160, the head 3 discharges the liquid containing the binder to the shaping region P of the three-dimensional shaped object in the layer 500. A second state diagram from a top of FIG. 2 shows a state where the head 3 discharges the liquid to the shaping region P of the layer

502 while the supply unit 8 moves in the X1 direction. Here, when the supply unit 8 moves in the X1 direction to form the layer 500, the first head 3A discharges the liquid. On the other hand, when the supply unit 8 moves in the X2 direction to form the layer 500, the second head 3B discharges the liquid.

Then, in step S170, the control unit 12 determines whether the head 3 ends discharging the liquid, and when it is determined that the head 3 ends discharging the liquid, moves the shaping table 9 downward in step S180, and cures the ultraviolet ray curable resin contained in the liquid in the shaping region P by the irradiation of ultraviolet rays from the ultraviolet ray irradiation portion 4 in step S190. Thereafter, in step S200, the control unit 12 determines whether the shaping table 9 moves by a predetermined amount L3, and in step S210, the control unit 12 determines whether a curing time for curing the ultraviolet ray curable resin contained in the liquid of the shaping region P is ended. A lowermost state diagram of FIG. 2 shows a state where the shaping table 9 moves by the predetermined amount L3, and the predetermined amount L3 in the present embodiment is a length corresponding to a layer thickness of the layer 500 to be formed next.

Here, as described above, in steps S120 and S130, the interval L1 between the upstream head 3 and the downstream roller 6 in the moving direction of the supply unit 8 is equal to or larger than the length L2 of the shaping region P. Therefore, in step S180, the shaping table 9 moves in a direction separating from the supply unit 8 after the upstream head 3 in the moving direction of the supply unit 8 ends discharging the liquid to the shaping region P and before the downstream roller 6 in the moving direction of the supply unit 8 faces the shaping region P. Therefore, contact between the roller 6 and the structure S of the three-dimensional shaped object during the manufacturing is prevented. In the method for manufacturing a three-dimensional shaped object of the present embodiment, step S180 and step S190 are simultaneously started, whereas the method is not limited to such a method. If there is a timing for the shaping table 9 to move in the direction separating from the supply unit 8 after the upstream head 3 in the moving direction of the supply unit 8 ends discharging the liquid to the shaping region P and before the downstream roller 6 in the moving direction of the supply unit 8 faces the shaping region P, either step S180 or step S190 may be started first.

Then, in step S220, the control unit 12 determines whether the formation of the entire layer 500 is ended based on the shaping data input in step S110. When it is determined that the formation of the entire layer 500 is not ended, the processing returns to step S120 to form the next layer 500. On the other hand, when it is determined that the formation of all the layers 500 is ended, the processing proceeds to step S230.

In step S230, a resin component of the structure S manufactured by repeating steps S120 to S220, such as a binder, is degreased using an external device or the like. A degreasing method includes, but is not limited to, a method of volatilizing the resin component by heating, and a method of immersing the structure S in a solvent to dissolve the resin component. This step S230 may be omitted depending on a type of the three-dimensional shaped object to be manufactured, such as a case of manufacturing a three-dimensional shaped object made of the resin.

In step S240, the structure S degreased in step S230 using the external device or the like is heated to sinter the shaping material. Even when the resin component such as a binder remains in the structure S after the execution of step S230, the resin component is removed along with the execution of step S240. Then, with an end of the step S240, the method for manufacturing a three-dimensional shaped object according to the present embodiment is ended. This step S240 may be omitted depending on the type of the three-dimensional shaped object to be manufactured, similar as in step S230.

That is, in the three-dimensional shaped object manufacturing device 1 according to the present embodiment, the control unit 12 performs control to, when moving the supply unit 8 in the X1 direction when shaping the three-dimensional shaped object, supply the powder from the first supply portion 2A, form the layer 500 containing the powder supplied to the shaping table 9 by the roller 6A, discharge the liquid to the shaping region P from the first head 3A, and move the shaping table 9 in the direction separating from the supply unit 8 after the first head 3A ends discharging the liquid to the shaping region P and before the roller 6B faces the shaping region P, and when moving the supply unit 8 in the X2 direction when shaping the three-dimensional shaped object, supply the powder from the second supply portion 2B, form the layer 500 containing the powder supplied to the shaping table 9 by the roller 6B, discharge the liquid to the shaping region P from the second head 3B, and move the shaping table 9 in the direction separating from the supply unit 8 after the second head 3B ends discharging the liquid to the shaping region P and before the roller 6A faces the shaping region P.

As described above, in the three-dimensional shaped object manufacturing device 1 according to the present embodiment, since the first supply portion 2A and the second supply portion 2B, the roller 6A and the roller 6B, and the head 3 are included in one supply unit 8, enlargement in a size of the device is prevented. In addition, since the shaping material supply portions 2 configured to supply the powder, the rollers 6 configured to form portions forming the layer 500, and the heads 3 are symmetrical in the reciprocating direction of the supply unit 8, the structure S of the three-dimensional shaped object can be manufactured in the forward and backward directions, so that the three-dimensional shaped object can be manufactured at a high speed. Further, since the shaping table 9 moves in the direction separating from the supply unit 8 before the roller 6 faces the shaping region P in the forward and backward directions, the contact between the roller 6 and the structure S of the three-dimensional shaped object during the manufacturing can be prevented.

As described above, in the three-dimensional shaped object manufacturing device 1 according to the present embodiment, the binder in the liquid is a resin cured by applying energy, and the binder is cured by the ultraviolet ray irradiation portion 4 as an energy applying portion included in the supply unit 8. Therefore, it is possible to firmly bind the powder by using the resin cured by applying the energy.

Here, the three-dimensional shaped object manufacturing device 1 according to the present embodiment includes, as the head 3, the first head 3A provided between the roller 6A and the ultraviolet ray irradiation portion 4 in the X direction, and the second head 3B provided between the roller 6B and the ultraviolet ray irradiation portion 4 in the X direction. Thus, by providing the ultraviolet ray irradiation portion 4 in a symmetrical arrangement in the reciprocating direction of the supply unit 8, the energy can be applied in the forward and backward directions, and the three-dimensional shaped object can be manufactured at a high speed. In the method for manufacturing a three-dimensional shaped object shown by the flowchart of FIG. 3, the application of energy from the ultraviolet ray irradiation portion 4 and the movement of the shaping table 9 in the direction separating from the supply unit 8 are simultaneously started, whereas the shaping table 9 may move in the direction separating from the supply unit 8 after the energy is applied from the energy applying portion. By moving the shaping table 9 in the direction separating from the supply unit 8 after the energy is applied from the energy applying portion, a decrease in the energy applied to the structure S of the three-dimensional shaped object can be prevented.

As described above, in the method for manufacturing a three-dimensional shaped object shown by the flowchart of FIG. 3, in step S200, the shaping table 9 moves by the predetermined amount L3 corresponding to the layer thickness of the layer 500 to be formed next. That is, in the three-dimensional shaped object manufacturing device 1 according to the present embodiment, when an (n+1)th layer 500 is to be formed after an n-th layer 500 is formed on the shaping table 9 with n being a natural number, the control unit 12 can control the shaping table 9 to move by a layer thickness of the (n+1)th layer 500 in the direction separating from the supply unit 8 when shaping a three-dimensional shaped object of the n-th layer. Thus, by controlling the shaping table 9, it is not necessary to move the shaping table 9 when forming the (n+1)th layer 500, and a movement control of the shaping table 9 can be simplified.

On the other hand, in the three-dimensional shaped object manufacturing device 1 according to the present embodiment, when the (n+1)th layer 500 is to be formed after the n-th layer 500 is formed on the shaping table 9, the control unit 12 can control the shaping table 9 to move by more than the layer thickness of the (n+1)th layer 500 in the direction separating from the supply unit 8 when shaping the three-dimensional shaped object of the n-th layer. Thus, by controlling the shaping table 9, a distance between the structure S and the roller 6 in the Z direction can be increased, and the contact between the roller 6 and the structure S of the three-dimensional shaped object during the manufacturing can be particularly effectively prevented. However, it is necessary to readjust a position of the shaping table 9 in the Z direction immediately before the (n+1)th layer 500 is formed.

In the three-dimensional shaped object manufacturing device 1 according to the present embodiment, the first layer forming portion and the second layer forming portion are the rollers 6 having rotation shafts in the Y direction intersecting the Z direction that is the shaping surface moving direction and the X direction that is the reciprocating direction. Then, the control unit 12 can perform control to, when moving the supply unit 8 in the X1 direction when shaping the three-dimensional shaped object, rotate the roller 6A as the first layer forming portion in a rotation direction R1 (see FIG. 1) such that a shaping table side 6T of the roller 6A faces the head side in the X1 direction, and when moving the supply unit 8 in the X2 direction when shaping the three-dimensional shaped object, rotate the roller 6B as the second layer forming portion in a rotation direction R2 (see FIG. 1) such that a shaping table side 6T of the roller 6B faces a head side in the X2 direction. In the three-dimensional shaped object manufacturing device 1 according to the present embodiment, the first layer forming portion and the second layer forming portion can be easily configured with the rollers 6, and by rotating the roller 6 such that the shaping table side 6T of the roller 6 faces the head side in the moving direction of the supply unit 8, the layer 500 can be formed with high accuracy as a powder layer.

Second Embodiment

Figure 4:
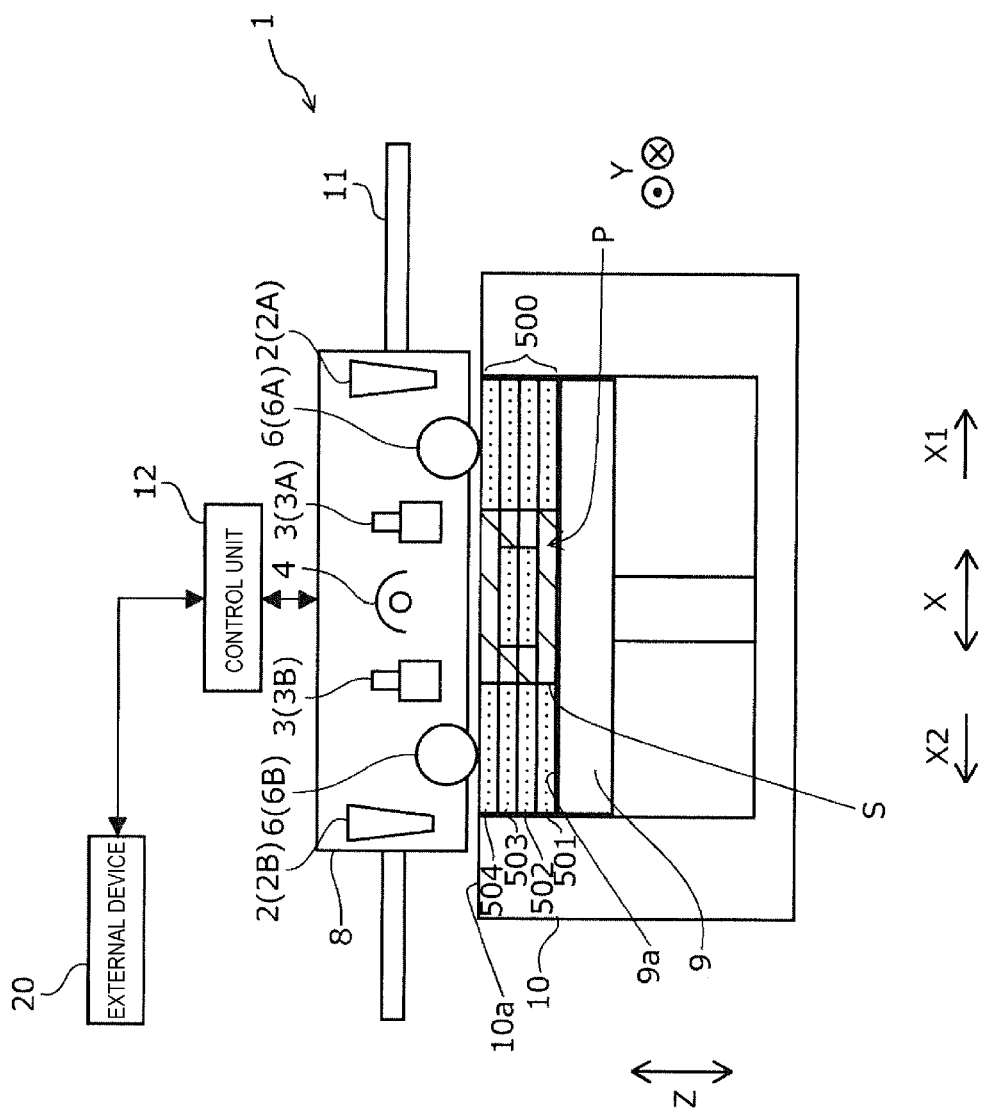
FIG. 4 is a schematic configuration diagram showing a three-dimensional shaped object manufacturing device according to a second embodiment of the present disclosure.

Next, an example of the three-dimensional shaped object manufacturing device 1 according to a second embodiment having a configuration different from the three-dimensional shaped object manufacturing device 1 according to the first embodiment will be described with reference to FIG. 4. FIG. 4 is a diagram corresponding to FIG. 1 for the three-dimensional shaped object manufacturing device 1 according to the first embodiment. Here, the three-dimensional shaped object manufacturing device 1 according to the present embodiment has a configuration similar to that of the three-dimensional shaped object manufacturing device 1 according to the first embodiment except for the supply unit 8. Specifically, the three-dimensional shaped object manufacturing device 1 according to the present embodiment is different from the three-dimensional shaped object manufacturing device 1 according to the first embodiment only in that the interval adjustment portions 5 configured to change the positions of the rollers 6 in the X direction are not included. Therefore, a description of the configuration other than the supply unit 8 that is a part having a common configuration is omitted. Structural members common to the first embodiment are denoted by the same reference numerals.

As shown in FIG. 4, the three-dimensional shaped object manufacturing device 1 according to the present embodiment does not include the interval adjustment portions 5. However, the head 3 and the roller 6 are disposed such that the interval L1 between the upstream head 3 and the downstream roller 6 in the moving direction of the supply unit 8 is equal to or larger than the length L2 of the shaping region P. Therefore, also in the three-dimensional shaped object manufacturing device 1 according to the present embodiment, similarly to the three-dimensional shaped object manufacturing device 1 according to the first embodiment, the contact between the roller 6 and the structure S of the three-dimensional shaped object during the manufacturing is prevented.

Third Embodiment

Figure 5:
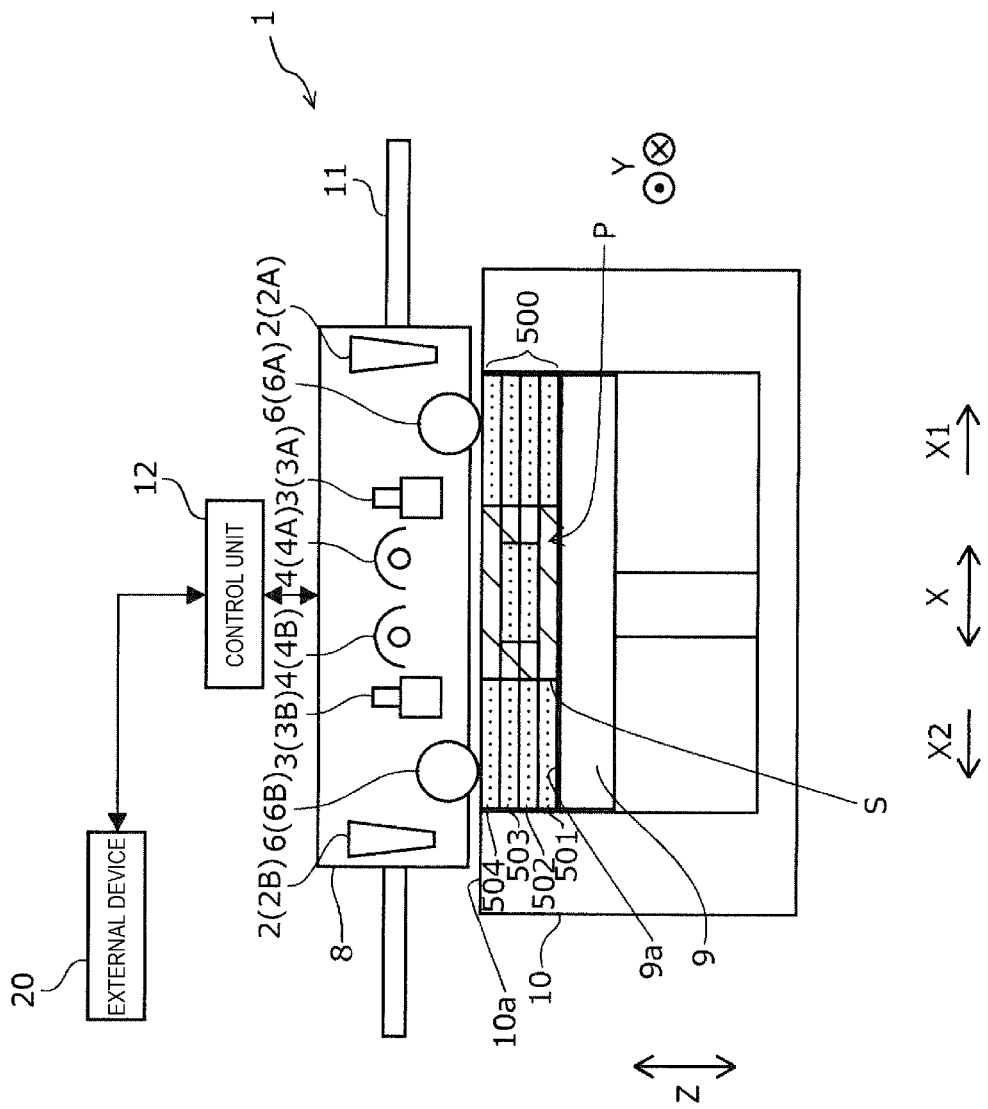
FIG. 5 is a schematic configuration diagram showing a three-dimensional shaped object manufacturing device according to a third embodiment of the present disclosure.

Next, an example of the three-dimensional shaped object manufacturing device 1 according to a third embodiment having a configuration different from the three-dimensional shaped object manufacturing devices 1 according to the first and second embodiments will be described with reference to FIG. 5. FIG. 5 is a diagram corresponding to FIG. 1 for the three-dimensional shaped object manufacturing device 1 according to the first embodiment and FIG. 4 for the three-dimensional shaped object manufacturing device 1 according to the second embodiment. Here, the three-dimensional shaped object manufacturing device 1 according to the present embodiment has a configuration similar to that of the three-dimensional shaped object manufacturing devices 1 according to the first and second embodiments except for the supply unit 8. Specifically, the three-dimensional shaped object manufacturing device 1 according to the present embodiment is different from the three-dimensional shaped object manufacturing device 1 according to the second embodiment only in that a plurality of ultraviolet ray irradiation portions 4 are included. Therefore, a description of the configuration other than the supply unit 8 that is a part having a common configuration is omitted. Structural members common to the first and second embodiments are denoted by the same reference numerals.

As shown in FIG. 5, the three-dimensional shaped object manufacturing device 1 according to the present embodiment includes a first energy applying portion 4A and a second energy applying portion 4B as the ultraviolet ray irradiation portion 4 serving as the energy applying portion.

Therefore, since the three-dimensional shaped object manufacturing device 1 according to the present embodiment can use, for example, different types of energy, it is possible to particularly effectively apply the energy to the structure S of the three-dimensional shaped object when a plurality of binders having different curing properties are used.

Fourth Embodiment

Figure 6:
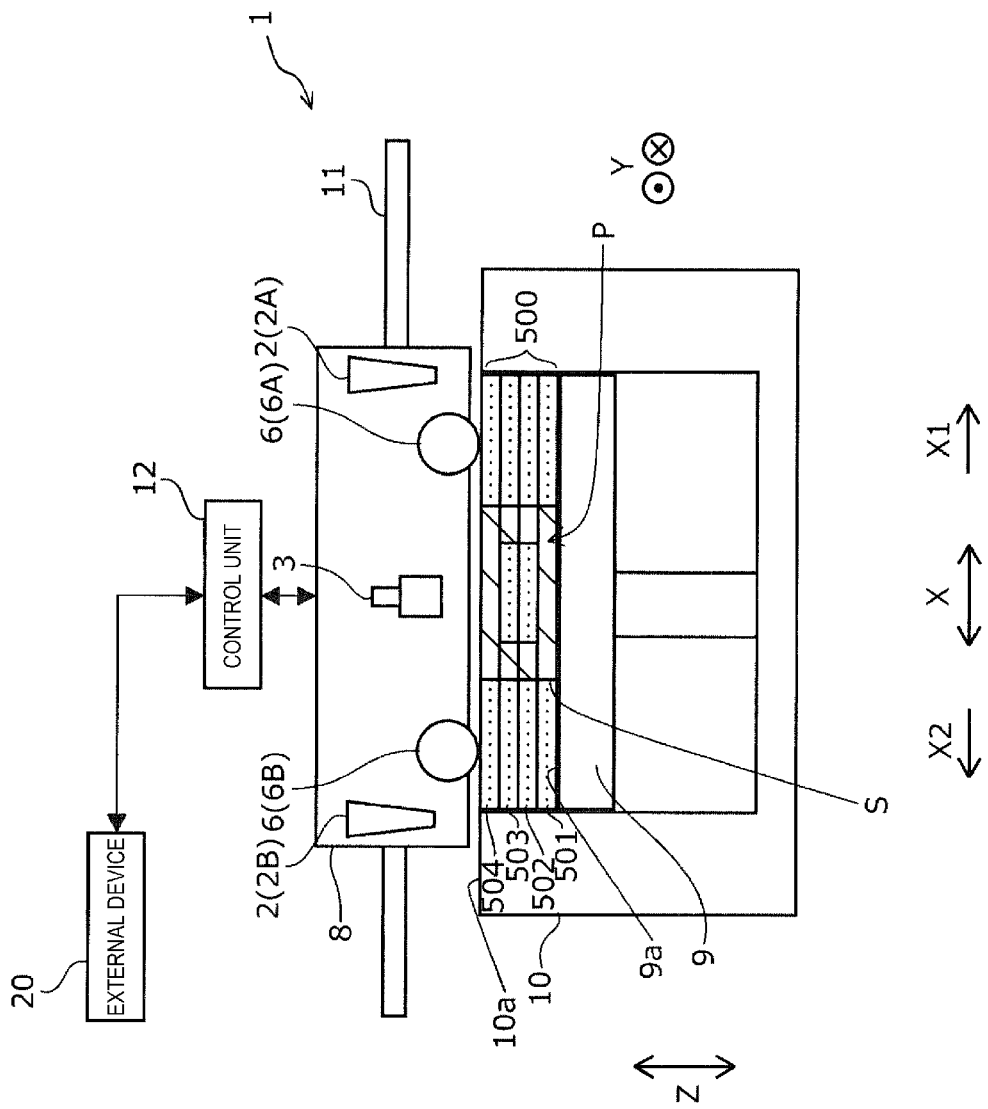
FIG. 6 is a schematic configuration diagram showing a three-dimensional shaped object manufacturing device according to a fourth embodiment of the present disclosure.

Next, an example of the three-dimensional shaped object manufacturing device 1 according to a fourth embodiment having a configuration different from the three-dimensional shaped object manufacturing devices 1 according to the first to the third embodiments will be described with reference to FIG. 6. FIG. 6 is a diagram corresponding to FIG. 1 for the three-dimensional shaped object manufacturing device 1 according to the first embodiment, FIG. 4 for the three-dimensional shaped object manufacturing device 1 according to the second embodiment, and FIG. 5 for the three-dimensional shaped object manufacturing device 1 according to the third embodiment. Here, the three-dimensional shaped object manufacturing device 1 according to the present embodiment has a configuration similar to that of the three-dimensional shaped object manufacturing devices 1 according to the first to the third embodiments except for the supply unit 8. Therefore, a description of the configuration other than the supply unit 8 that is a part having a common configuration is omitted. Structural members common to the first to the third embodiments are denoted by the same reference numerals.

As shown in FIG. 6, the three-dimensional shaped object manufacturing device 1 according to the present embodiment includes only one head 3 and does not include the energy applying portion. The binder contained in the liquid discharged from the head 3 of the present embodiment is a liquid in which a solid resin is dissolved in a volatile solvent. When using such a liquid, since the solvent in the liquid can be naturally dried, the structure S of the three-dimensional shaped object can be formed without the energy applying portion. In a configuration having no energy applying portion, even in a configuration including only one head 3, the structural members are disposed symmetrically in the X direction. Therefore, the three-dimensional shaped object manufacturing device 1 according to the present embodiment can also execute a shaping operation of the three-dimensional shaped object while moving the supply unit 8 in the X1 direction, and execute a shaping operation of the three-dimensional shaped object while moving the supply unit 8 in the X2 direction.

The present disclosure is not limited to the embodiments described above, and may be implemented by various configurations without departing from the scope thereof. For example, in order to solve some or all of problems described above, or to achieve some or all of effects described above, technical characteristics in the embodiments corresponding to the technical characteristics in each embodiment described in the summary of the disclosure can be replaced or combined as appropriate. If the technical characteristics are not described as essential in the present description, they can be deleted as appropriate.

What is claimed is:

1. A three-dimensional shaped object manufacturing device, comprising:
a shaping table that includes a shaping surface of a three-dimensional shaped object, and the shaping table is configured to move the shaping surface in a shaping surface moving direction that intersects the shaping surface;
a unit configured to reciprocate in a reciprocating direction with respect to the shaping table and includes a first and second supply portion configured to supply powder, a first and second layer forming portion configured to form a powder layer on the shaping table using the powder, and at least one head configured to discharge a liquid containing a binder to a shaping region of the three-dimensional shaped object on the powder layer wherein,
the order of the components of the unit from a head side in a forward direction that is in the reciprocating direction is; the first supply portion, the first layer forming portion, the head, the second layer forming portion, and the second supply portion,
and an interval between the first layer forming portion and the head is greater than the length of the shaping region of the three-dimensional shaped object and an interval between the second layer forming portion and the head is greater than the length of the shaping region of the three-dimensional shaped object; and
a control unit configured to control the unit and the shaping table, wherein
the control unit is configured to performs control such that,
when moving the unit in the forward direction and when shaping the three-dimensional shaped object, supply the powder from the first supply portion, form the powder layer on the shaping table using the powder with the first layer forming portion, discharge the liquid to the shaping region from the head, and move the shaping table in a direction separating from the unit after discharging the liquid to the shaping region is ended and before the second layer forming portion faces the shaping region, and
when moving the unit in a backward direction in the reciprocating direction and when shaping the three-dimensional shaped object, supply the powder from the second supply portion, form the powder layer on the shaping table using the powder with the second layer forming portion, discharge the liquid to the shaping region from the head, and move the shaping table in the direction separating from the unit after discharging the liquid to the shaping region is ended and before the first layer forming portion faces the shaping region.

2. The three-dimensional shaped object manufacturing device according to claim 1, wherein
the binder is a resin cured by applying energy, and
the unit includes at least one energy applying portion for curing the binder.

3. The three-dimensional shaped object manufacturing device according to claim 2, wherein
the head includes a first head provided on a first layer forming portion side in the reciprocating direction and a second head provided on a second layer forming portion side in the reciprocating direction, and the energy applying portion is provided between the first head and the second head in the reciprocating direction.

4. The three-dimensional shaped object manufacturing device according to claim 2, wherein
the energy applying portion includes a first energy applying portion and a second energy applying portion.

5. The three-dimensional shaped object manufacturing device according to claim 1, wherein
when an (n+1)th powder layer is to be formed after an n-th powder layer is formed on the shaping table with n being a natural number, the control unit controls the shaping table to move by a layer thickness of the (n+1)th powder layer in the direction separating from the unit when shaping a three-dimensional shaped object of the n-th layer.

6. The three-dimensional shaped object manufacturing device according to claim 1, wherein
when an (n+1)th powder layer is to be formed after an n-th powder layer is formed on the shaping table with n being a natural number, the control unit controls the shaping table to move by more than a layer thickness of the (n+1)th powder layer in the direction separating from the unit when shaping a three-dimensional shaped object of the n-th layer.

7. The three-dimensional shaped object manufacturing device according to claim 1, wherein
the first layer forming portion and the second layer forming portion are rollers having rotation shafts in a direction intersecting the shaping surface moving direction and the reciprocating direction, and
the control unit performs control to,
when moving the unit in the forward direction when shaping the three-dimensional shaped object, rotate the first layer forming portion such that a shaping table side of the first layer forming portion faces the head side in the forward direction, and
when moving the unit in the backward direction when shaping the three-dimensional shaped object, rotate the second layer forming portion such that a shaping table side of the second layer forming portion faces a head side in the backward direction.

8. The three-dimensional shaped object manufacturing device according to claim 1, wherein
the interval between the first layer forming portion and the head in the reciprocating direction and the interval between the second layer forming portion and the head in the reciprocating direction are adjustable.

* * * * *